(12) United States Patent
Hamilton (10) Patent No.: US 6,296,091 B1
(45) Date of Patent: Oct. 2, 2001

(54) SUSPENSION CONTROL UNIT AND CONTROL VALVE

(75) Inventor: James M. Hamilton, Solana Beach, CA (US)

(73) Assignee: Kenmar Company Trust, Solona, CA (US)

( * ) Notice: Subject to any disclaimer, the term of this patent is extended or adjusted under 35 U.S.C. 154(b) by 0 days.

(21) Appl. No.: 09/439,107

(22) Filed: Nov. 11, 1999

Related U.S. Application Data (60) Provisional application No. 60/107,999, filed on Nov. 11, 1998.

(51) Int. Cl.[7] ........................................................... F16F 9/00
(52) U.S. Cl. ........................ 188/314; 251/129.07; 251/52
(58) Field of Search .................... 280/5.515, 124.159; 188/314, 297, 313, 281, 266.2, 266.1, 266.5, 266.6, 319.1; 251/324, 129.07, 125.15, 50, 52

(56) References Cited

U.S. PATENT DOCUMENTS

| | | | |
|---|---|---|---|
| 2,247,749 | 7/1941 | d'Espinassy de Venel | 280/124 |
| 2,571,449 | 10/1951 | Hobbs | 267/60 |

(List continued on next page.)

FOREIGN PATENT DOCUMENTS

| | | |
|---|---|---|
| 1079482 | 11/1954 | (FR) . |
| 1393808 | 5/1975 | (GB) . |
| 1485003 | 9/1977 | (GB) . |
| 2012913 A | 8/1979 | (GB) . |
| 173629 | 10/1982 | (JP) . |
| 7316435 | 11/1973 | (NL) . |
| WO 85/04698 | 10/1985 | (WO) . |
| WO 96/05975 | 2/1996 | (WO) . |

OTHER PUBLICATIONS

Attachment 1: Relief Valves series RD083 and RD093, enlarged picture of valve.*
Burness, Bruce, The Long and Short of Suspension.
Hamilton, James M., Computer–Optimized Adaptive Suspension Technology (Coast), Reprinted from IEEE Transactions on Industrial Electronics, vol. IE–32, No. 4, Nov. 1985; pp. 355–363.
Parker Motion & Control, Pressure Control Valves (Installation Information), Hydraulic Valve Division, Elyria, Ohio 44035, pp. 145–146.
Parker Motion & Control, Relief Valves Series RD 102.

(List continued on next page.)

*Primary Examiner*—Robert J. Oberleitner
*Assistant Examiner*—Xuan Lan Nguyen
(74) *Attorney, Agent, or Firm*—Christie, Parker & Hale, LLP (57) ABSTRACT

A suspension control unit as well as a control valve for such unit are provided which are incorporated in a computerized suspension system which automatically and continuously monitors and control's a vehicle's ride performance. The suspension control unit is composed of an actuator and a fluid control unit. A valve is coupled to the actuator for controlling the fluid pressure within the actuator. The valve has an annular body having a side inlet passage and an outlet opening in communication with the reservoir. A poppet driven by a solenoid is slideably fitted within the body wherein the poppet can slide between a first position blocking flow to the outlet opening and a second position not blocking the flow to the outlet opening. The poppet has a shoulder that is exposed to the inlet. Fluid pressure to the inlet of the valve acts on the differential area of the poppet to produce an poppet retracting force which is opposed by the force of an electrically adjustable solenoid. When pressure reaches the solenoid setting, the poppet is retracted to the open position, permitting flow through the valve.

39 Claims, 4 Drawing Sheets

U.S. PATENT DOCUMENTS

| | | | |
|---|---|---|---|
| 3,063,701 | | 11/1962 | Long, Jr. .................................. 267/64 |
| 3,063,702 | | 11/1962 | Long, Jr. .................................. 267/64 |
| 3,366,286 | | 1/1968 | Kloehn .................................. 222/386 |
| 3,379,851 | | 4/1968 | Weremey ............................. 200/159 |
| 3,574,352 | | 4/1971 | Elliott .................................. 280/124 |
| 3,737,141 | * | 6/1973 | Zeuner .................................. 251/129 |
| 3,807,678 | | 4/1974 | Karnopp et al. ................. 248/358 R |
| 3,861,696 | | 1/1975 | Gustafsson ........................... 280/6 H |
| 3,945,664 | | 3/1976 | Hiruma ........................... 280/124 F |
| 4,216,977 | | 8/1980 | Fujii .................................... 280/707 |
| 4,270,771 | | 6/1981 | Fujii .................................... 280/707 |
| 4,382,604 | | 5/1983 | Nakagawa ........................... 280/6 H |
| 4,468,050 | | 8/1984 | Woods et al. ....................... 280/707 |
| 4,468,739 | | 8/1984 | Woods et al. ....................... 364/424 |
| 4,634,142 | | 1/1987 | Woods et al. ....................... 280/707 |
| 4,720,085 | | 1/1988 | Shinbori et al. .................. 267/64.16 |
| 4,722,548 | | 2/1988 | Hamilton et al. ................... 280/707 |
| 4,729,459 | | 3/1988 | Inagaki et al. ....................... 188/299 |
| 5,168,448 | | 12/1992 | Matsumoto et al. ............ 364/424.05 |
| 5,200,895 | * | 4/1993 | Emura et al. ................... 364/424.05 |
| 5,203,584 | | 4/1993 | Butsuen et al. ..................... 280/707 |
| 5,290,048 | * | 3/1994 | Takahashi et al. ................. 280/6.12 |
| 5,295,705 | | 3/1994 | Butsuen et al. ..................... 280/707 |
| 5,303,804 | * | 4/1994 | Spiess .................................. 188/319 |
| 5,341,844 | * | 8/1994 | Wass et al. .......................... 137/613 |
| 5,344,124 | * | 9/1994 | Runkel ............................. 267/64.15 |
| 5,411,050 | * | 5/1995 | Saville ................................. 137/101 |
| 5,416,701 | | 5/1995 | Kawabata ....................... 364/424.05 |
| 5,449,055 | | 9/1995 | Geiling et al. ........................ 188/299 |
| 5,466,007 | | 11/1995 | Smith .................................. 280/840 |
| 5,486,018 | * | 1/1996 | Sakai .................................. 280/714 |
| 5,529,152 | | 6/1996 | Hamilton et al. ................... 188/299 |
| 5,722,454 | * | 3/1998 | Smith et al. ......................... 137/503 |
| 5,735,372 | | 4/1998 | Hamilton et al. ................... 188/299 |
| 5,791,630 | * | 8/1998 | Nakao et al. .................... 251/129.19 |
| 5,927,448 | * | 7/1999 | Yamazaki ............................. 188/281 |
| 5,984,059 | | 11/1999 | Kurachi et al. ...................... 188/318 |
| 6,024,366 | | 2/2000 | Masamura ..................... 280/124.162 |

OTHER PUBLICATIONS

Parker Motion & Control, Relief Valves Series RD083 and RD093.

Parker Motion & Control, Relief Valves Series RD103, p. 10.

Parker Motion & Control, Relief Valve with Reverse Free Flow Check Valves Series RDC103, p. 12.

Parker Motion & Control, Relief Valves Series RA161, p. 22.

Parker Motion & Control, Pressure Reducing Valves Series PR101.

Parker Motion & Control, Pressure Reducing Valves Series PR161, p. 30.

Parker Motion & Control, Pressure Reducing Valves Series PR102.

Parker Motion & Control, Pressure Reducing Spool Series PRS102, p. 36.

Parker Motion & Control, Pressure Reducing Spool Series PRS162.

Parker Motion & Control, Sequence Valves Series SV101.

Parker Motion & Control, Series SV102.

Parker Motion & Control, Differential Area Unloading Relief Valves, Series RU101, p. 48.

Csere, Csaba, A flurry of innovation at Subaru, and a radio that listens to you, Technical Highlights, Japan 1985, Car & Driver, Nov. 1984, p. 65.

* cited by examiner

SUSPENSION CONTROL UNIT AND CONTROL VALVE

CROSS-REFERENCE TO RELATED APPLICATION

This application claims priority and is based on U.S. Provisional Patent Application Serial No. 60/107,999, filed on Nov. 11, 1998.

BACKGROUND OF THE INVENTION

The present invention is related to suspension systems and specifically to a suspension control unit incorporated in a vehicle computer controlled suspension system and to the fluid control unit and valves incorporated in the suspension control unit.

Computer controlled suspension systems use a computer to control the damping provided by each of the suspension system actuators. Typically, computer suspension systems incorporate actuators on to which are mounted electrically adjustable valves which are driven by computer to control the flow of hydraulic fluid the actuators and thus control the damping provided by the actuators.

Virtually all of these computer suspension control systems on the market use orifice controlled flow valves to regulate damping forces. There are several reasons why orifice control has become the de-facto standard. One reason is that conventional shock absorbers have always used orifice control technology, and as such orifice controlled technology is better understood and more easily adapted to computer control. Another reason is that traditional and commonly accepted feedback control theory is better implemented with orifice control techniques. Moreover, orifice control valves can be considerably smaller than the constant force (pressure regulating) valves. Furthermore, constant force valves incorporated in computer control systems, in principle, result in very harsh and totally unacceptable performance. Use of constant force valves in computer controlled suspension systems has required in many instances the use of bulky and expensive accumulators to smooth abrupt force transitions that occur with the operation of the constant force pressure regulating valves. However, orifice control valves are not capable of being constantly and very rapidly adjusted as a wheel of the vehicle coupled to a corresponding actuator moves so as to provide for optimum damping.

As such, a suspension control system is desirable that is not subject to the problems of orifice controlled valves, and which incorporates valves that are not susceptible to the adjustment limitations and instabilities of current control valves.

SUMMARY OF THE INVENTION

A suspension control unit as well as a novel fluid control unit incorporating at least a novel control valve are provided which are incorporated in a computerized suspension system which automatically and continuously monitors and control's a vehicle's ride performance to provide soft and stable ride characteristics at all times by controlling the damping provided by each of the vehicles actuators (i.e., shock absorbers). The suspension control unit comprises a fluid control unit and a vehicle actuator. The fluid control unit is coupled to an actuator of a vehicle. Specifically, each actuator of a vehicle has a fluid control unit coupled to it. In forming a suspension control unit, each fluid control unit may be maintained separate from its corresponding actuator or may be integrated with its corresponding actuator into a single package.

Each fluid control unit comprises a reservoir which receives fluid displaced by the movement of the rod (and piston) in and out of the actuator. A position sensor and preferably a Linear Variable Inductive Transformer ("LVIT") position sensor is fitted within the reservoir to sense the volume of fluid within the reservoir. A microprocessor is coupled to the reservoir and receives signals from the position sensor for ascertaining the position of the actuator at any given time. An optional temperature sensor is also coupled to the reservoir for sensing the temperature of the fluid within the reservoir. The temperature sensor provides the microprocessor with the fluid temperature information so as to allow the microprocessor to ascertain the absolute position of the actuator by accounting for changes in the fluid volume due to temperature changes. Depending on the position of the actuator (and various other vehicle inputs), the microprocessor controls a pair of valves mounted on the reservoir for controlling the pressure of fluid entering or leaving the fluid control unit reservoir and thereby, controlling the pressure of the fluid entering or leaving the actuator and thus, controlling the damping provided by such actuator.

Each valve mounted on the reservoir comprises an annular body having a side passage and an end opening in communication with a passage on the reservoir, and a poppet slideably fitted within the body. The poppet can slide between a first seated position blocking the end opening of the valve body and a second retracted position not blocking the end opening. The poppet is moved into position blocking the end opening by a solenoid. A spring is used to slide the poppet back to a position not blocking the end opening when the solenoid is deactivated.

The poppet comprises a conical section and a cylindrical section extending from the larger diameter portion of the conical section. The conical section defines a tip portion of the poppet which is used to block the end opening of the valve body. The diameter of the largest diameter portion of the conical section is smaller than diameter of the cylindrical section. Consequently, an annular shoulder is formed extending radially around the poppet between the conical and cylindrical sections.

The conical tip section of the poppet is not exposed to the side passage when the poppet is in the seated position. As a result, the fluid pressure through the side passage is reacted against the poppet annular shoulder which is always exposed to the side passage whether the poppet is seated in the valve body or retracted from its seated position. Consequently, the fluid provides a force against the poppet annular shoulder tending to retract the poppet. A solenoid is incorporated that provides a variable force that tries to keep the valve seated in the closed position blocking the end opening of the valve body. As a result, the force set by the solenoid determines the pressure required to open the valve. Hence, the solenoid allows the valve to become an adjustable pressure regulator.

Since the area of the poppet annular shoulder exposed to the fluid pressure remains constant throughout the poppet stroke from a seated to a completely retracted position, the force generated by a given fluid pressure against the annular shoulder is constant tending to provide for a constant pressure regulation at different fluid flow rates. In other words, as the flow rate is increased, thereby increasing the fluid pressure, a larger force is reacted against the annular shoulder tending to retract the poppet further thereby canceling out the pressure created by the increased in fluid flow, thus, alleviating the instability problems associated with current valves incorporating poppets.

Moreover, applicant has discovered that a conical surface which is a section of a 70° cone, i.e., a conical surface whose surfaces are tapered at 55° relative to a plane perpendicular to the conical surfaces central axis, works optimally. This is because as the pressure on the poppet annular shoulder starts to open the valve, the fluid flow causes dynamic forces on the conical surface which would tend to close the valve (i.e., seat the poppet). However, as the poppet is retracted, the fluid pressure is reacted on a portion of the conical surface generating a retracting force as well as lateral force on the poppet. Applicant discovered that with the 55° angle, the retracting force on the conical surface tends to cancel the dynamic flow force. This results in a constant pressure drop over wide ranges of fluid flow (e.g. 0 to over 50 gallons per minute).

The movement of the poppet is stopped when a flange extending from the poppet engages an inner annular shoulder formed on the valve body. As a result, the valve body is not loaded by the tip of the poppet as with conventional poppet valves alleviating the need to use expensive hardened steel as is used in the valve body of a conventional poppet valve for enduring the pounding by the poppet tip.

A spring biased check valve is slideably fitted around the body of each valve body to allow for flow out of the reservoir. When flow is tending to retract the poppet from its seated position, the check valve is closed and the valve regulates the fluid pressure. When the direction of flow reverses (i.e., the other valve is allowing flow to enter the reservoir) the check valve opens to allow the fluid to be bypassed back to the actuator. As the actuator pushes fluid back and forth through the fluid control unit reservoir, the pressures are correspondingly controlled in each direction as the fluid flows through one controlling valve and bypasses the other.

The fluid control unit and specifically the control valves of the present invention provide for a smooth metering of fluid to and from the actuators without the need for the large and expensive accumulators. Moreover, the fluid control unit of the present invention has a LVIT position sensor integrated into the reservoir. Furthermore, the valves of the present invention provide for better operational stability, are smaller and less costly, have longer fatigue lives and incorporate an optimum conical tip angle for providing a flat pressure response over different flow rates.

DETAILED DESCRIPTION

The suspension control unit of the present invention is incorporated in a computerized suspension system which automatically and continuously monitors and control's a vehicle's ride performance to provide soft and stable ride characteristics at all times. The system can be configured to any specific land surface transportation vehicle such as a car, truck, bus, or agricultural equipment.

Figure 1:
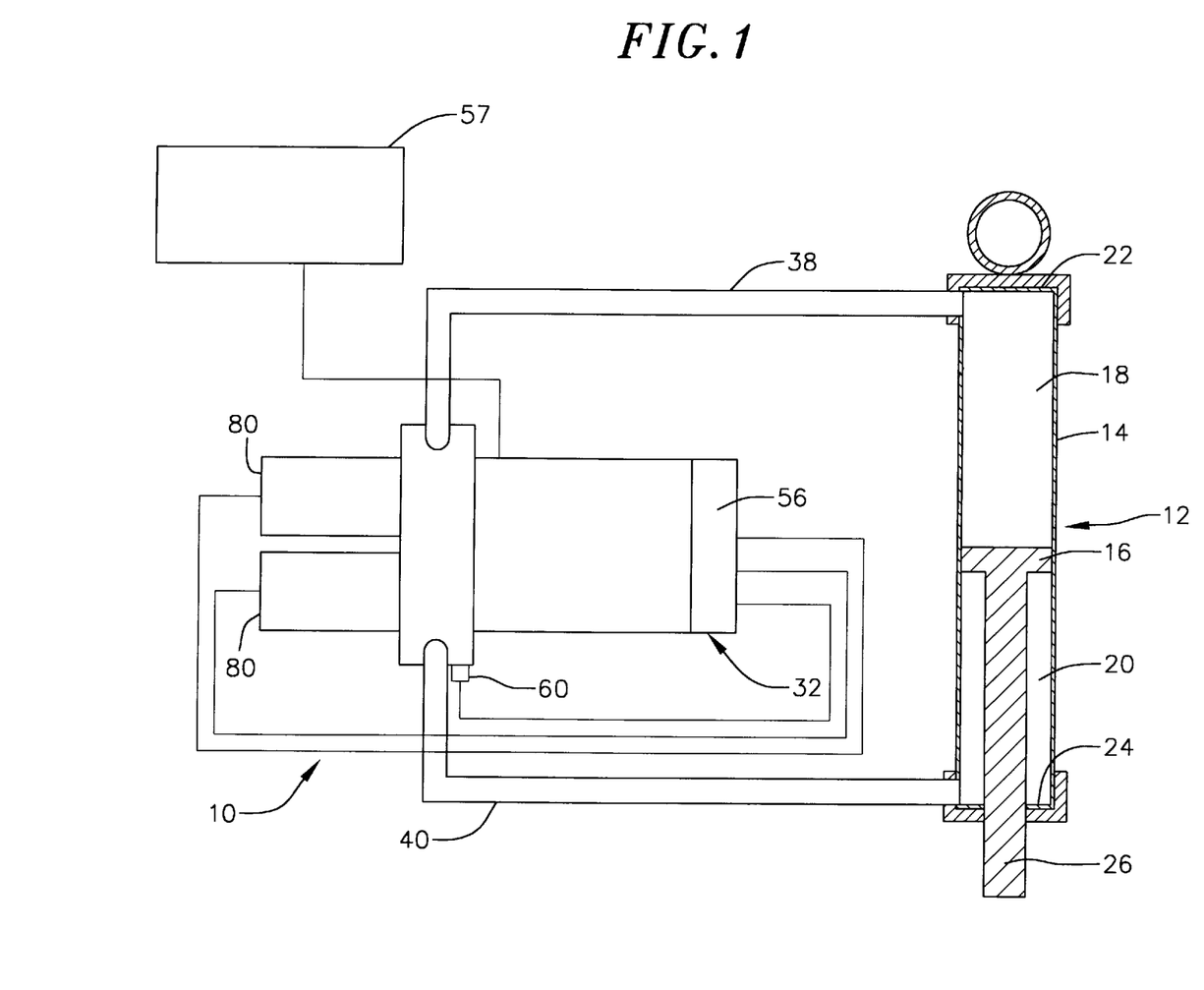
FIG. 1 is a schematic of the suspension control unit of the present invention.

In a preferred embodiment, a fluid control unit 10 is coupled to each actuator 12 of a vehicle via fluid conduits, i.e., hydraulic lines, 38, 40 as shown in FIG. 1. Each fluid control unit with its corresponding actuator for a suspension control unit. The fluid control unit may be separate from the actuator or may be integrated with the actuator.

Each actuator typically comprises a cylindrical housing 14. The actuator cylindrical housing (also referred to herein as a "cylinder") used in the system are filled with a fluid. A piston 16 is fitted within the cylinder and reciprocates longitudinally along the cylinder. The piston divides the cylinder into two chambers, i.e., a first chamber 18 and a second chamber 20, each filled with fluid. In the exemplary embodiment, each chamber is filled with hydraulic fluid.

The first chamber extends from a first end 22 of the cylinder to the piston 16. The second chamber extends from a second end 24 of the cylinder to the piston 16. The volume of each chamber changes as the piston reciprocates along the length of the cylinder. A shaft 26 longitudinally aligned with the cylinder 14 is connected to the piston 16 and extends externally beyond the second end 24 of the cylinder. As the shaft is moved in or out of the cylinder it causes the piston to reciprocate within the cylinder.

Figure 2:
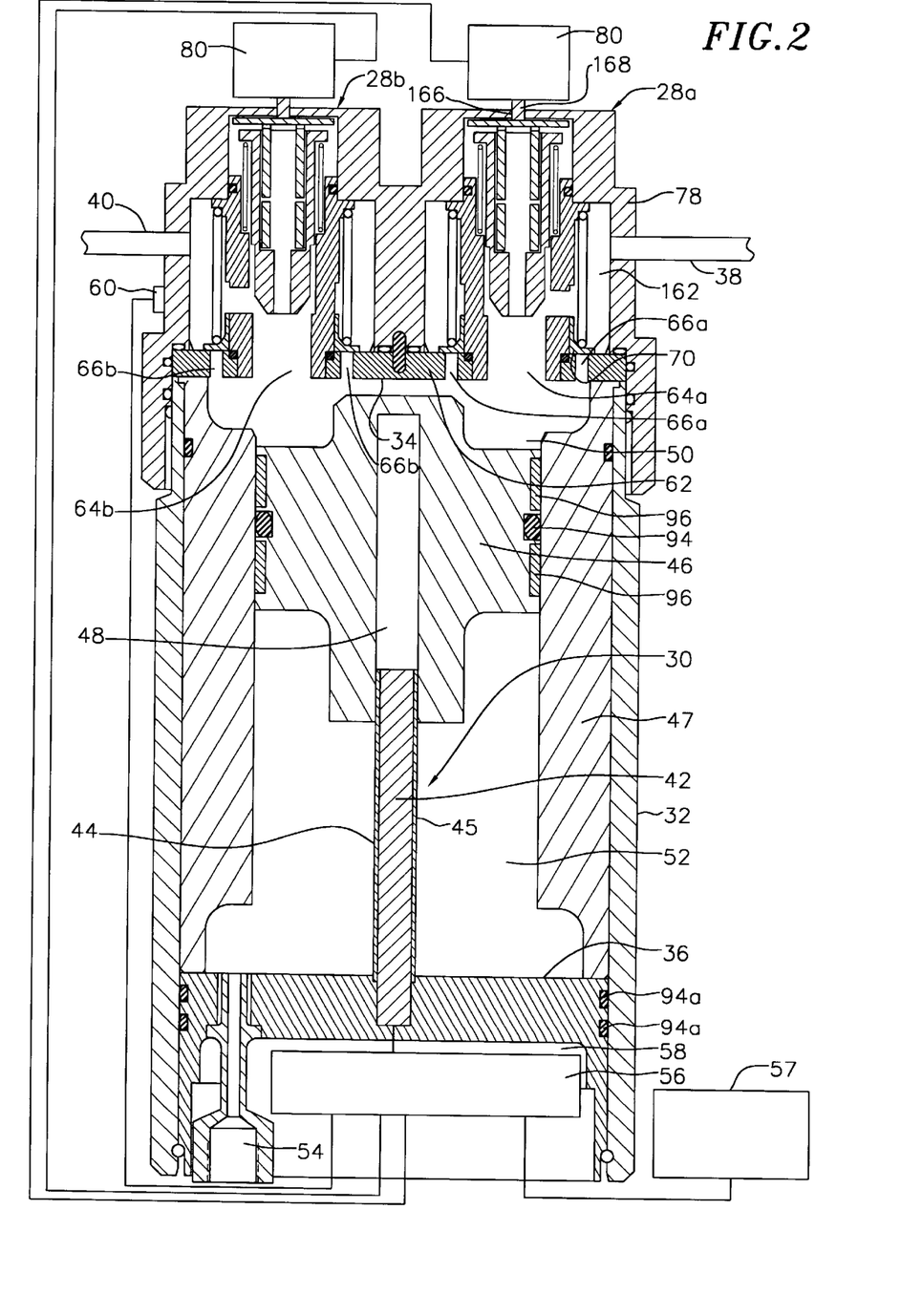
FIG. 2 is a cross-sectional view of a fluid control unit of the present invention.

Referring to FIG. 2, the fluid control unit 10 comprises one but preferably two solenoid driven control valves 28a, 28b and a Linear Variable Inductive Transformer ("LVIT") position sensor 30 housed within a reservoir 32, referred to herein for convenience as the "sensor reservoir". The fluid control unit also comprises a microprocessor controller 56 (the "microprocessor"). An optional second computer controller 57 may also be connected to each fluid control unit on the vehicle. If a second computer controller is used, then all of the fluid control units in vehicle are preferably connected to a single computer controller 57. Preferably, the microprocessor controller is mounted on the reservoir. The algorithms, software and hardware for running the microprocessor controllers and the computer controller in a computerized suspension system incorporating the suspension control units of the present invention are disclosed in an application entitled "Enhanced Computer Optimized Adaptive Suspension" having James M. Hamilton and Lonnie K. Woods as inventors and being filed concurrently herewith and in PCT International Publication No. WO 96/05975 published on Feb. 29, 1996. This application and publication are both fully incorporated herein by reference.

The sensor reservoir is preferably a cylindrical chamber having a first end 34 opposite a second end 36. One but preferably, two solenoid driven pressure regulating valves control the inflow of fluid to the sensor reservoir. A first fluid line 38 couples the first solenoid valve 28a to the first actuator chamber 18 (FIG. 1). A second fluid line 40 couples the second solenoid valve 28b to the second actuator chamber 20. While the valves can be mounted at different locations on the sensor reservoir, in the exemplary embodiment shown in FIG. 2 they are mounted on the first end 34 of the sensor reservoir 32.

The LVIT sensor comprises a bobbin 42 with a wire 44 coiled around it. The bobbin extends perpendicularly from the second end 36 of the sensor reservoir. A potting material coating 45 is formed over the coil. The coil creates a field. A sensor piston 46, preferably made from aluminum, slides within the sensor reservoir. The sensor piston 46 has an opening forming a sleeve 48 extending perpendicularly within the sensor piston body as shown in the exemplary embodiment depicted in FIG. 2. A preferred LVIT sensor is made by Lucas Controls. Alternatively, the sleeve may be in the form of a tube extending perpendicularly from the sensor piston 46. In a further alternate embodiment (not shown), the sleeve may extend from the second end 36 of the sensor reservoir while the bobbin may extend from the sensor piston 46.

The sensor piston divides the sensor reservoir into a first portion 50 in communication with the control valves 28a, 28b and a second portion 52. Consequently, the sensor reservoir first portion receives fluid from the actuator 12. The volume of the first and second sensor reservoir portions change as the sensor piston reciprocates along the reservoir length. The sensor reservoir second portion between the second end of the sensor reservoir and the piston is filled with pressurized gas, and preferably with $N_2$ at preferably at about 250 psi. This is typically accomplished through a fitting 54 having an air valve (not shown) mounted to the second end 36 of the sensor reservoir. The pressurized gas applies a force against the piston and thus, against the fluid in the first portion of the sensor reservoir on the other side of the piston.

An end cap 58 is defined at the second end 36 of the reservoir. The end cap 58 has a double O-ring 94a to help seal the high pressure gas stored in the sensor reservoir second portion. The reservoir piston 46 also has two Teflon slide rings 96 that allow the piston to move smoothly within the chamber. An insert sleeve 47 is optionally added within the chamber to allow the chamber to accommodate different diameter pistons 46. The stroke of the piston 46 is a function of the volume of fluid displaced by the actuator piston with rod. By allowing different size pistons 46, the reservoir of a fluid control unit can be used for different size actuators without re-designing the entire fluid control unit.

As fluid enters or leaves the sensor reservoir first portion it causes the piston and thus, the sleeve to slide over the coiled bobbin. As the sleeve slides over the coil it destroys the field generated by the coil portion covered by the sleeve. Because of its function, the sleeve is commonly referred to as a "spoiler". The field is monitored by a microprocessor 56. The microprocessor is preferably a computer module which is fitted in an end cap 58 defined behind the second end of the sensor reservoir.

In the exemplary embodiment shown in FIG. 2, each solenoid control valve is mounted on an interface plate 62 mated externally to the first end 34 of the sensor reservoir 32. The interface plate has two main openings 64a, 64b to accommodate the flow through each control valve and into the reservoir. In addition the interface plate has one but preferably an annular row of by-pass openings 66a, 66b, surrounding each of the main opening, respectively. Flow through the by-pass openings surrounding a main opening are controlled by a check valve 70 which is integral to the control valve controlling the flow through the main opening. Openings corresponding to the main openings and by-pass openings are also formed on the first end 34 of the sensor reservoir so that the main and bypass openings can communicate with the sensor reservoir first portion. Since it is desirable in the embodiment incorporating two control valves that both control valves are identical, only the first control valve 28a is described herein.

Referring to FIGS. 1 and 2, as the actuator piston 16 and shaft 26 move toward the actuator cylinder first end 22, i.e., as the piston and shaft retract within the cylinder 12, the piston 16 displaces fluid from the actuator first chamber 18 through the first fluid conduit 38 and the first control valve 28a and into the LVIT sensor reservoir first portion 50 moving the sensor piston 46 toward the sensor reservoir second end and over the bobbin 42. Simultaneously, fluid is drawn into the second chamber 20 of the actuator through the second valve 28b and second fluid conduit 40 via the by-pass openings 66b. However, because of the piston shaft 26 within the actuator housing second chamber 20, for a given retracting actuator piston stroke, the amount of fluid drawn into the second chamber is less than the amount of fluid displaced from the first chamber. Consequently, as the actuator piston retracts (i.e., slides toward the first end of the cylinder), fluid is accumulated in the sensor reservoir first portion 50 causing the LVIT sensor piston 46 to slide toward the sensor reservoir end 36 such that the spoiler 48 slides over the wire coil destroying the field generated by the spoiler covered coil.

Similarly, as the actuator piston 16 and shaft 26 move in an extending direction (i.e., toward the cylinder second end 24), the amount of fluid displaced from the actuator second chamber 20 is less than the amount of fluid drawn into the actuator first chamber 18. As a result, fluid is withdrawn from the sensor reservoir first portion 50 causing the LVIT piston to move away from the sensor reservoir second end 36 and toward the sensor reservoir first end 34 and expose more of the coil windings, thereby increasing the strength of the field generated by the coil. Movement of the sensor piston 48 when fluid is withdrawn from the sensor reservoir first portion is caused by the suction created by the withdrawing fluid. The pressurized gas in the second portion 52 of the sensor reservoir serves to prevent a vacuum from forming in the reservoir first portion which would result in undesirable fluid cavitation.

The microprocessor 56 is calibrated for ascertaining the position of the piston within the cylinder by monitoring the strength of the field generated by the coil. To account for the expansion and contraction of the fluid volume due to temperature changes, an optional temperature sensor 60 is coupled to the sensor reservoir and to the microprocessor. Typically, the temperature sensor is mounted on the valve housing 78. An exemplary sensor is the 1M10023-B3 temperature sensor manufactured by Dale Electronics. This temperature sensor has a linearity of less than 1% and an operational range of −50° to 250° F. The temperature sensor sends signals to the microprocessor relating to the temperature of the fluid. The microprocessor then re-calibrates the position of the actuator piston 16 accounting for fluid volume expansions or contractions due to temperature changes thereby ascertaining the absolute position of the actuator piston. If the computer controller doesn't require absolute position, the temperature sensor is not required.

Figure 3:
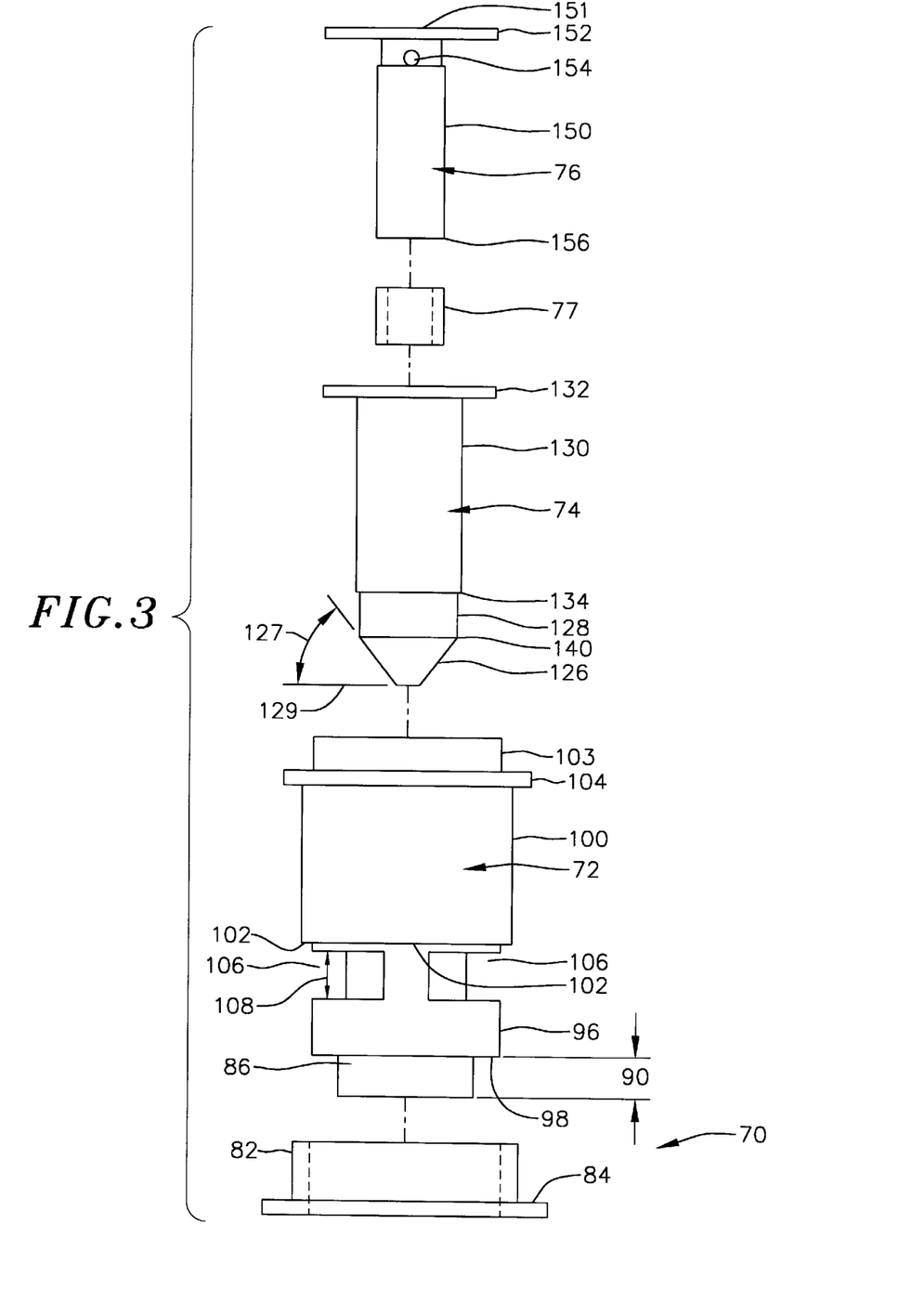
FIG. 3 is an exploded side view of an exemplary control valve of the present invention excluding the springs and housing.
Figure 4:
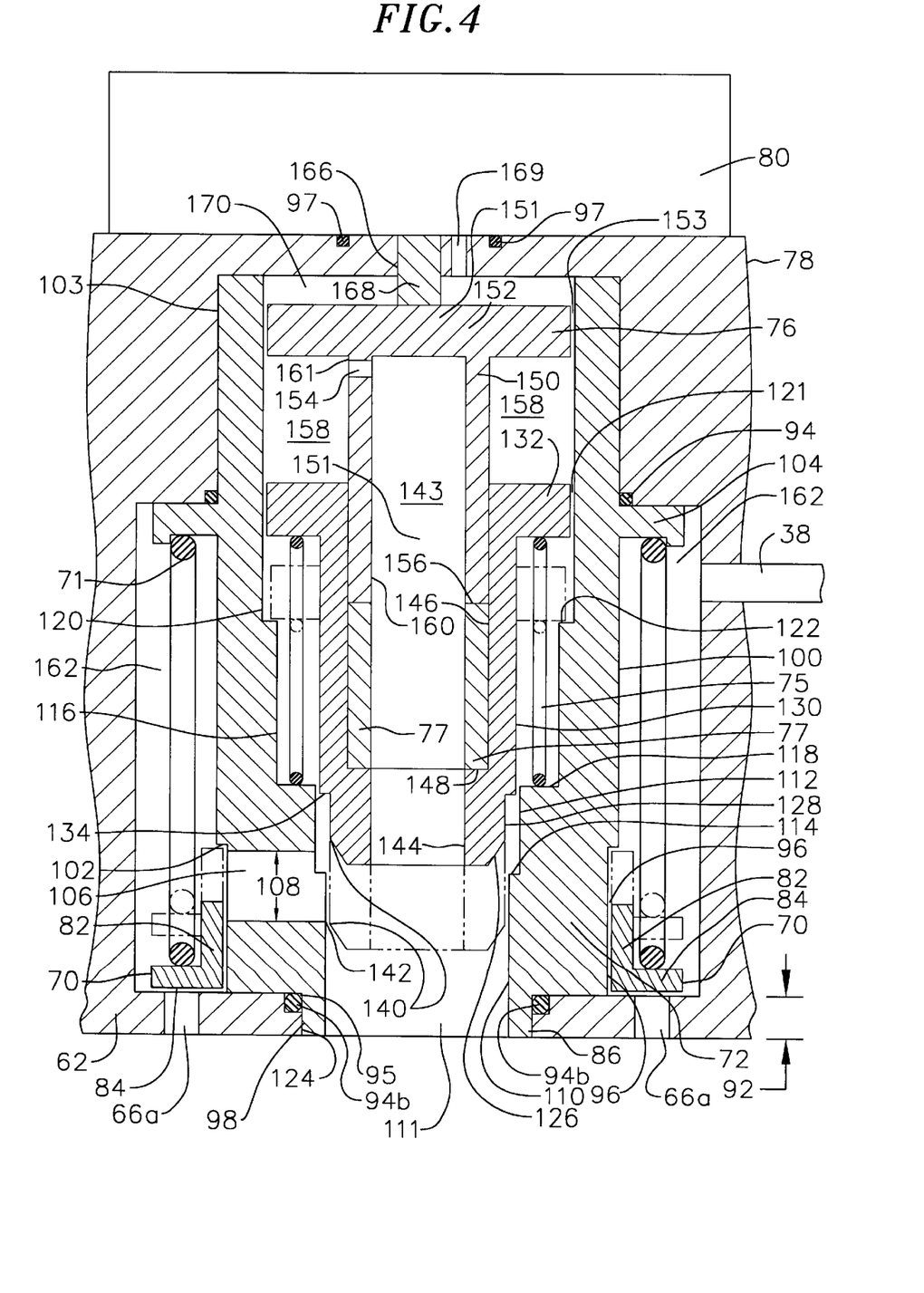
FIG. 4 is a cross-sectional view of the exemplary control valve shown in FIG. 3.

Referring to FIGS. 2–4, each control valve comprises a check valve 70, a check valve spring 71, a main body 72, a poppet 74, a poppet spring 75, a solenoid damper 76, a de-coupling member 77, a housing 78 and a solenoid 80.

An exemplary check valve 70 is an annular member having an "L" shaped cross-section. In other words, the check valve comprises an annular circumferential wall 82 from which extends a radially outward annular flange 84. The circumferential wall defines an inner opening 86. The check valve is positioned over the interface plate 62 of the sensor reservoir such that its annular flange 84 covers the by-pass openings 66a formed on the interface plate.

The valve main body 72 is generally cylindrical and preferably made from steel. For descriptive purposes the exemplary valve body outer surface described herein is divided into three sections. The outer surface first section 86 has a diameter slightly smaller than the diameter of the main opening 64a formed on the interface plate. The first section spans a length 90 not greater than the thickness 92 of the interface plate and preferably has a length equal to the thickness of the interface plate.

A second outer surface section 96 extends from the outer surface first section and has a diameter greater than the diameter of the first section. Consequently, an annular shoulder 98 is formed at the base surface of the second section 96 at the intersection between the outer surface first and second sections. For descriptive purposes this shoulder is referred to herein as the body "first outer annular shoulder". The body outer surface second section has a diameter that is slightly smaller than the inner diameter of the check valve annular wall 82.

A third outer surface section 100 extends from the second outer surface section 96. The third outer surface section has a diameter larger that the diameter of the second outer surface section. Consequently, a body second outer annular shoulder 102 is defined by the base of the third section at the intersection between the second and third sections. The third outer surface section diameter is greater than the inner surface diameter of the check valve. An annular flange 104 extends radially from the end of the third section opposite the body second outer annular shoulder 102.

A fourth outer surface section 103 extends from the third section 100 adjacent to the annular flange 104. Preferably, the fourth section diameter is slightly smaller than the diameter of the third section.

Annular section slots 106 are formed through the second outer surface section 96 adjacent to the third outer surface section 100. The annular section slots penetrate the entire thickness of the body 72. In a preferred embodiment, four equidistantly spaced annular section slots 106 are formed on the body penetrating through the second outer surface section. The slots have a width 108 along the length of the valve body.

The inner surface of the body is also divided into three sections for descriptive purposes. The first or smallest diameter section 110 spans the outer surface first section 86 and a portion of the outer surface second section 96. The first inner section defines an end opening 111 of the valve body which communicates with the annular slot sections. A second inner section 112 extends from the first inner section and extends to a location within the third outer surface section 100. Consequently, a first inner annular shoulder 114 is defined by the body inner surface first section at the intersection between the body inner surface first and second sections.

A body inner surface third section 116 extends from the second inner surface section 112 and has a diameter larger than the diameter of the body inner surface second section. Consequently, a second inner annual shoulder 118 is formed of the intersection of the inner surface second and third sections. The body inner surface third section extends to a location within the third outer surface section 100.

A fourth body inner surface section 120 extends from the third inner section. The inner surface fourth section has a larger diameter than the inner surface third section. Thus, a third inner annular shoulder 122 is defined between the body inner surface third and fourth section. The body inner surface fourth section extends to the fourth outer surface section 103.

The valve body 72 is mounted on the interface plate 62 with the first outer section 86 penetrating the annular check valve 70 and the main opening 64a on the interface plate. Prior to mounting the body onto the interface plate, the check valve spring 71 having an inner diameter slightly larger than the diameter of the body outer surface third section is fitted over the annular check valve such that the spring surrounds the circumferential wall 82 of the check valve and rests on the annular flange 84 of the check valve. The body is mounted within the spring on the interface plate such that the spring is sandwiched between the check valve annular flange 84 and the annular flange 104 extending from the valve body outer surface. When the body is mounted on the interface plate 62, the first annular shoulder 98 rests on the interface plate. A seal 94b surrounding the outer surface of the body outer surface first section 86 provides a seal between the outer surface first section and the interface plate edge 124 defining the main opening 64a. In this regard, the seal 94b provides a seal between the body outer surface and the interface plate.

The poppet 74 is fitted within the valve body sandwiching a poppet spring 75. The poppet is also preferably made of steel. The poppet comprises a frustoconical (also referred to herein as a "conical") outer surface section 126 from which extends a cylindrical outer surface first section 128 from which extends a cylindrical outer surface second section 130. The second section 130 was a diameter larger than the diameter of the outer surface first section 128. Consequently, a poppet outer annular shoulder 134 is defined by the second poppet outer surface section 130 at the intersection between the poppet first and second outer surface sections. An annular flange 132 extends radially from the end of the second cylindrical section 130. The poppet annular flange 132 has an outer diameter smaller than the body inner surface fourth section 120 and greater than the diameter of the body inner surface third section 116. An annular gap 121 is defined between the annular flange and the body inner surface fourth section which is large enough so as to not restrict fluid flow during rapid movements of the poppet during valve operation. The conical section 126 is a section of a 70° cone, i.e., it is a section that is tapered at an angle 127 of 55° from a plane 129 perpendicular to the central axis of the cone (FIG. 3). The poppet outer surface first section 128 has an outer surface diameter slightly smaller than the diameter of the body inner surface first section 110. The diameter of the poppet outer surface second section 130 is slightly smaller than the diameter of the valve body inner surface second section 112 but greater than the diameter of the body inner surface first section 110.

The poppet spring 75 is seated within the body second inner annular shoulder 118 prior to fitting the poppet within the body. The poppet spring has an inner diameter greater than the diameter of the poppet outer surface second section 130 but smaller than the diameter of poppet annular flange 132. The poppet spring outer diameter is smaller than the diameter of the body inner surface third section 116. When the poppet is within the valve body 72, the spring is sandwiched between the poppet annular flange 132 and the body second inner annular shoulder 118.

The poppet can push against the spring force generated by the poppet spring until the poppet annular flange 132 engages the third inner annular shoulder 122 of the body. In other words, the third inner annular shoulder 122 serves as a stop to the stroke of the poppet within the valve body. When the poppet is stopped against the third inner annular shoulder 122, the entire width 108 of the annular section slots 106 formed through the valve body are covered by the poppet outer surface first section 128 and a portion of the poppet outer surface second section 130. In a preferred embodiment, when the poppet is stopped against the valve body third inner annular shoulder 122 as shown by the dashed lines in FIG. 4, the annular edge 140 defined at the intersection of the poppet outer surface conical section 126 and the poppet outer surface first section 128 is aligned with the annular section edges 142 of the annular section slots 106 at the body inner surface first section 110. The poppet has an inner cavity 143 having a first inner surface portion 144 and a second inner surface portion 146. The second portion has a larger diameter than the first portion whereby a poppet inner annular shoulder 148 is defined at the intersection between the two inner surface portions. A compliant de-coupling member (also referred to herein as a "de-coupler"), preferably a polyurethane or other plastic cylindrical member 77, is fitted within the poppet and rests against the poppet inner shoulder 148.

The solenoid damper 76 is coupled to a solenoid 80 via a solenoid piston 168 and comprises a cylindrical member 150 having an inner cavity 158 and a cap 151 defining an annular flange 152 extending radially from an end of the cylindrical member. The outer surface diameter of the cap is slightly smaller than the diameter of the body inner surface fourth section 120. A passage 154 is formed through the cylindrical member 150 near the annular flange 152 providing a passage between the inner surface 160 and the outer surface 161 of the cylindrical member. The passage 154 should be large enough (or consist of several holes) so as to not restrict fluid flow during rapid movements of the poppet during valve operation. A preferred solenoid is an Elwood Corporation solenoid having part number 160071-202. This type of solenoid is typically referred to as a "Linear Servo Solenoid" because it provides a constant force over the entire range of its stroke. This constant force is necessary for proper operation of the control valve as a pressure regulator, as the force must be constant regardless of the position of the poppet 74.

The solenoid damper 76 is fitted within the poppet cavity 143 such that the end 156 of the solenoid damper cylindrical member 150 can come into contact with the de-coupling member 77. The solenoid damper annular flange 152 remains external to the poppet cavity and defines an annular space 158 with the annular flange 132 of the poppet. The passage 154 formed on the cylindrical member 150 of the solenoid damper provides a passage between the inner surface 160 of the cylindrical member and the annular space 158.

A housing 78 is fitted over the valve body 72. In the exemplary system shown in FIG. 2, the housing is mounted over the interface plate 62 on the sensor reservoir 32. The housing is fastened or otherwise connected to the sensor reservoir and retains the control valve in position on the reservoir. A valve annular chamber 162 is formed between the housing inner surface and the body outer surface. The check valve 70 and check valve spring 71 are located within the valve annular chamber 162. The valve annular chamber 162 is in communication with the annular section slots 106. The fluid conduit 38 is coupled to the housing typically via a fitting (not shown) and is in communication with the valve annular chamber 162. As such, fluid from the fluid conduit 38 is delivered to the valve annular chamber 162 and fluid from the annular chamber 162 can flow back through the fluid conduit 38.

In a preferred embodiment, the solenoid 80 is external of the housing 78 and is coupled to the solenoid damper 76 through an opening 166 formed on the housing. A piston 168 of the solenoid penetrates the housing for providing the appropriate force on the solenoid damper and thus, the poppet. A seal 97, preferably an O-ring seal, is provided in surrounding relationship to the piston 168 so to prevent the escape of fluid from the opening 166. Furthermore, the solenoid is a "wet" solenoid, in that it receives fluid from valve housing via a passage 169 formed through the housing adjacent to the solenoid piston 168. By letting the pressurized fluid surround the solenoid's internal piston core (not shown), the force required for the solenoid to push the solenoid piston 168 can be kept lower than if the piston core was not surrounded by the pressurized fluid. This is because the differential between the pressure in the solenoid and the pressure acting against the poppet is reduced.

The entire assembly contains numerous O-rings 94 for properly sealing chambers from each other and preventing fluid from escaping the system, as can be seen in FIGS. 2 and 4.

In operation, the LVIT sensor 30 and the optional temperature sensor 60 are used by the microprocessor 56 to ascertain the position of the actuator piston 16 relative to the actuator 12. The microprocessor 56 uses this information to perform calculations that determine the desired pressure setting for each valve 28a or 28b. The microprocessor 56 then provides the appropriate electrical signals to the solenoids 80 to cause them to generate the desired pressure settings.

A typical vehicle application incorporates a suspension control unit (with a microprocessor 56) at each corner (wheel). In an optional embodiment, there may be another microprocessor 57 in communication with all of the suspension control unit microprocessors 56. This "central" microprocessor 57 can distribute additional sensor signals, such as vehicle speed, cornering conditions, braking, etc. for more sophisticated calculations and thus improved performance.

To apply the appropriate control force to the poppet, the solenoid 80 pushes on the solenoid damper, which pushes on the de-coupling member 77, which in turn pushes on the poppet inner shoulder 148. The movement of the solenoid valve is opposed by the poppet spring 75. When the solenoid is deactivated, the poppet spring retracts the poppet from its seated position causing the solenoid damper to retract and displace the solenoid piston. The poppet may be pushed by the solenoid damper until the poppet flange 132 is stopped against the valve body third inner shoulder 122. The de-coupler 77 forms a very stiff spring that helps quiet the metal-to-metal impact each time the poppet shoulder 132 contacts the valve body third inner shoulder 122. In essence, the de-coupler quiets the hammering of the solenoid piston as it is activated and deactivated. The de-coupler also helps the valve to retract faster by allowing the poppet to start moving upward against the solenoid even before the relatively large mass of the solenoid has a chance to move.

When the poppet is completely seated within the body, i.e., when the poppet flange 132 is seated on the body third inner shoulder 122, the poppet blocks the flow through the valve body end opening 111 thereby preventing the flow of fluid through the valve body 72 and thus through the control valve 28a. At this position, the annular edge 140 defined at the intersection between the poppet conical outer surface 126 and the poppet outer surface first section 128 is preferably at the same level with, or is below, the edge 142 of the slots 106 located on the body inner surface first section 110.

When the poppet is fully seated in the valve body, fluid displaced from the actuator to the valve annular chamber 162 generates a fluid pressure through the flow slots 106 which is reacted against the poppet outer shoulder 134. The poppet outer shoulder 134 is always fully exposed to the slots 106 and thus, to the fluid pressure, regardless of the position of the poppet. Consequently, the fluid pressure provides a force against the exposed poppet annular shoulder 134 tending to retract the poppet. In conventional poppet style pressure regulating valves, the pressure sensing shoulder is formed at the valve seat where the flow occurs. With conventional poppet valves, when the valve is in the closed seated position, a portion of the poppet conical surface is exposed to the side opening while it simultaneously blocks the end opening of the cylindrical body. The only force generated for unseating the poppet is generated by the pressure from the fluid flow being reacted against the conical surface of the poppet. Consequently, a force is generated tending to retract the poppet toward a position not blocking the side opening and the end of the cylindrical body. As the poppet is retracted further, the force generated against the conical surface is increased as most of the conical surface is exposed to the fluid flow. This causes stability problems because the pressure sensing area can be effected by dynamic flow forces. In the inventive valve, the pressure sensing area is located at the annular shoulder 134, which is out of the path of the flow and therefore less effected by dynamic flow forces. Moreover, because the movement of the poppet in the control valve of the present invention is stopped when the poppet flange 132 engages the third inner annular shoulder 122 formed on the valve body, the valve body is not loaded by the tip of the poppet as is done in conventional poppet valves where the stroke of the poppet is stopped when the poppet tip portion engages and plugs an end opening of the poppet valve body. Consequently, the control valve of the present invention alleviates the need to use expensive hardened steel to coat the inner valve body as is done with conventional poppet valves for strengthening the valve body which is exposed to the pounding by the poppet tip.

As the poppet is retracted, even slightly, from the fully seated position, the conical surface of the poppet is exposed to the slots 106. Applicant has discovered that a conical surface which is a section of a 70° cone, i.e., a conical surface whose surfaces are tapered at 55° relative to a plane perpendicular to the central axis of the conical surfaces, provides nearly flat pressure regulation over varying flow rates, i.e., it causes the poppet to retract or seat just enough to cancel any increase or decrease in pressure that would form as a result of increased or decreased fluid flow, respectively. Moreover, applicant discovered that with the 55 tapered conical surface, the retracting force generated by the fluid pressure cancelled out the dynamic flow forces generated by the fluid flow.

When the piston 16 in the actuator 12 is moving in a direction that is pushing fluid through fluid line 40, i.e. as the actuator piston is moving in an extending direction, the pressure in the actuator second chamber 22 will be regulated by the valve 28b. After the fluid passes through the valve 28b it flows through the sensor reservoir 32 and returns to the actuator chamber 18 through the by-pass opening 66a and fluid line 38. The by-pass openings 66a are normally blocked by the check valve flange 84, which is held down by the check valve spring 71. But while the fluid in the actuator second chamber 22 is being displaced via fluid line 40, the actuator first chamber 18 is withdrawing fluid into it through fluid line 38. This results in a pressure drop in actuator first chamber 18 relative to the pressure in the sensor reservoir. As a result, the fluid pressure is reacted though the by-pass openings 66a and against the check valve annular flange 84 causing the check valve to retract against the check valve spring force provided by the check valve spring 71. When that occurs, hydraulic fluid can flow from the sensor reservoir 32 through the by-pass openings 66a, through the annular chamber 162 and through the fluid conduit 38 and back to the actuator first chamber 18. The pressure level is a function of the check valve spring 71 compliance, and is set as small as possible to minimize the required pressure drop. Moreover, the pressurization of the fluid resulting from the gas pressure in sensor reservoir chamber 52 prevents the pressure drop across the check valve from becoming negative which can cause undesirable formation of bubbles (e.g. if the fluid in the system is pressurized to 250 psi and the check valve requires a 10 psi drop to open, the pressure in the sensor reservoir chamber 50 would be 250 psi and the pressure in the annular chamber 162 would be 240 psi).

The check valve stroke is limited by the body first outer shoulder 102. When the check valve stroke is stopped against the body first outer shoulder 102, the check valve peripheral wall 82 blocks the flow slots 106 preventing any inflow of fluid through the solenoid valve body and into the sensor reservoir. When the fluid direction changes and the valve starts to operate as a pressure regulator, the check valve spring 71 closes the valve and the fluid pressure now acts to hold the check valve flange 84 over the by-pass opening 66a, forcing the flow through the valve slots 106 as desired. As can be seen the flow paths are mutually exclusive—during pressure regulation the check valve is fully seated, i.e., closed, and flow is through slots 106, but during return flow the slots 106 are closed and flow is through the check valve opening. During the return flow a differential pressure is acted on the poppet causing the poppet to seat, i.e., move to the closed position.

Fluid from the sensor reservoir also fills the poppet cavity 143. Fluid from the cavity 143 also travels through the passage 154 of the cylindrical member 150 and fills the annular space 158 formed between the annular flange 152 of the solenoid damper and the annular flange 132 of the poppet. Moreover, fluid is able to flow past the annular flange 152 of the solenoid damper 76 and into a space 170 defined between the solenoid damper cap 151 and the valve housing 78. In order for the solenoid damper 76 to reciprocate, the fluid in the space 170 must pass back and forth through the annular gap 153 formed between the solenoid damper flange 152 and the valve body inner surface fourth section 120. This gap is carefully selected to ensure that the solenoid is adequately damped to prevent undesirable oscillations which would otherwise occur. Without such solenoid damping, the valve has a tendency to oscillate because the mass of the solenoid piston 168 and the solenoid magnetic force forms a sprung-mass system. Furthermore, when the poppet is retracted fluid is able to flow into the spaces between the body inner surface and the poppet outer surface. The fluid within the poppet and solenoid damper cavities and within the annular space 158 and space 170, as well as the fluid surrounding the poppet provide for damping of the poppet and solenoid damper vibrations that are generated as the solenoid is activated and deactivated.

The pressure drop through the valve is a function of the flow rate and flow opening size, i.e., the size of the opening defined between the edges 142 of the slots and the peripheral edge 140 defined at the intersection between the first and conical sections of the poppet. The operation of this valve forms a pressure regulator by automatically adjusting the flow opening size for varying flow rates. The constant pressure is automatically maintained by the balancing of forces between the solenoid force tending to close the valve and the pressure force on the annular surface 134 tending to open the valve.

Although the present invention has been described and illustrated to respect to multiple embodiments thereof, it is to be understood that it is not to be so limited, since changes and modifications may be made therein which are within the full intended scope of this invention as hereinafter claimed. For example, the valve body outer surface first and second sections may have the same diameter, i.e., the first and second sections may be a single section. In such case, the valve body first section will have to rest against the interface plate without penetrating the interface plate. Moreover, the valve body may be formed without an outer surface fourth section. Further, it should be understood the a fluid control unit can include only one valve for control in only one direction. For example, the valve can control flow from the actuator first chamber to the sensor reservoir as the actuator piston with shaft are extended, while the check valve incorporated in the valve can control the flow back to the actuator first chamber as the piston with shaft are retracted. Moreover, the valve or valves could be separate from the reservoir. For example, the valve or valves can attached to the actuator and the reservoir alone could be remotely connected to the valve(s) by the appropriate conduit(s).

What is claimed is:

1. A suspension control unit for controlling damping, comprising:

an actuator comprising a housing divided into a first and a second chamber by a piston slidably fitted within the housing, wherein each of the first and second chambers has a volume, wherein the volume of the first and second chambers changes as the piston reciprocates within the actuator housing;

a fluid reservoir storing fluid and coupled to the actuator, the reservoir having at least an inlet;

a sensor within the reservoir for generating signals indicative of the amount of fluid in the reservoir;

at least one valve coupled to the actuator and to the reservoir inlet, the valve comprising, an annular body having an inner surface, a first annular shoulder defined on the body inner surface, an outer surface, a side passage, an end opening extending from the first annular shoulder to an end of the body, and a flow path between the side passage and end opening coupling a chamber in the actuator to the reservoir, wherein the annular body comprises an inner and an outer surface, and a poppet slidably fitted within the body wherein the poppet can slide between a first position blocking the flow path and a second position not blocking the flow path, wherein the poppet comprises, a conical tip section and a poppet shoulder extending radially beyond the conical tip section, and an annular outer surface section between the conical tip section and the poppet shoulder, wherein the annular outer surface section is at least partially within the end opening when the poppet is in the first position; and a microprocessor for ascertaining the position of the actuator piston responsive to the signals generated by the sensor.

2. A suspension control unit as recited in claim 1 wherein the sensor comprises:

a coiled bobbin extending within the reservoir; and a sensor piston slidably fitted within the reservoir, the piston having an opening on one side for accommodating the bobbin and a second opposite side dividing the reservoir into a, first reservoir portion in communication with the fluid and a second reservoir portion housing the bobbin, wherein as the first reservoir portion is filled with fluid it causes the piston to slide toward the bobbin such that the bobbin penetrates the opening.

3. A suspension control unit as recited in claim 2 wherein the second reservoir portion is filled with pressurized gas.

4. A suspension control unit as recited in claim 1 wherein the conical tip section of the poppet is a section of a 70° cone.

5. A suspension control unit as recited in claim 4 wherein the annular section and the poppet shoulder are always in communication with the side passage.

6. A suspension control unit as recited in claim 5 wherein the valve body side passage comprises a plurality of circumferentially spaced apart annular slot sections.

7. A suspension control unit as recited in claim 6 wherein each annular slot section comprises a width defined between a slot section first end and a slot section second end, wherein the poppet comprises a circumferential edge defined at the intersection of the conical section and the poppet annular outer surface section, and wherein when the poppet is in the first position, the poppet circumferential edge is radially aligned with first ends of the slot sections.

8. A suspension control unit as recited in claim 1 wherein the valve further comprises:

a valve body second inner shoulder formed on the inner surface of the body; and a poppet flange extending radially from an end portion of the poppet for engaging the body inner shoulder for stopping the poppet in the first position.

9. A suspension control unit as recited in claim 8 wherein the valve further comprise a spring sandwiched between the body second inner shoulder and the poppet flange.

10. A suspension control unit as recited in claim 1 wherein the valve poppet is hollow having an inner surface and wherein the valve further comprises:

a poppet inner shoulder formed on the inner surface of the poppet;

a compliant member seated on the poppet inner shoulder;

a solenoid; and a solenoid damper coupled to the solenoid and to the compliant member for transferring a load generated by the solenoid to the compliant member for moving the poppet.

11. A suspension control unit as recited in claim 10 wherein the solenoid damper comprises:

a hollow member having an inner and an outer surface; and a flange extending from an end of the member, wherein an opening is formed on the hollow member proximate the flange providing a passage from the inner surface of the hollow member to the outer surface of the hollow member, wherein an annular space is defined between the poppet annular flange and the flange of the solenoid damper, wherein the annular space is in communication with the hollow member opening, and wherein the poppet inner surface, the hollow member inner surface and the annular space are filled with fluid from the sensor reservoir.

12. A suspension control unit as recited in claim 1 further comprising:

a housing surrounding the body and defining a valve chamber between the body outer surface and the housing for receiving fluids from an actuator chamber;

a by-pass opening on the reservoir surrounding the reservoir inlet and located within the valve chamber, the by-pass opening providing access to the fluid within the reservoir;

an annular check valve within the valve chamber and surrounding the valve body, the annular check valve comprising, an annular wall, and a check valve flange radially extending from the annular wall for covering the by-pass opening.

13. A suspension control unit as recited in claim 12 further comprising:
- a flange extending from the body outer surface within the valve chamber; and
- a spring sandwiched between the body flange and the check valve flange for holding the check valve in a first position where the check valve flange covers the by-pass opening surrounding the passage, wherein the check valve can slide against a force created by the second spring to a second position allowing fluid flow from the reservoir through the by-pass opening.

14. A suspension control unit as recited in claim 13 wherein the valve body outer surface further comprises a shoulder, wherein said body outer surface shoulder is engaged by the annular wall of the check valve to stop the check valve at the second position.

15. A suspension control unit as recited in claim 1 wherein the control valve is mounted on the reservoir in communication with the inlet, the suspension control unit further comprising:
- a second inlet on the reservoir;
- a second control valve identical to the first control valve and mounted on the reservoir in communication with the second inlet;
- a first fluid conduit coupling the first control valve to the actuator first chamber; and
- a second fluid conduit coupling the second control valve to the actuator second chamber.

16. A suspension control unit as recited in claim 1 further comprising a temperature sensor for sensing the temperature of the fluid flow through the valve, the temperature sensor being coupled to the microprocessor for transferring signals indicative of the sensed temperature to the microprocessor.

17. A valve comprising:
- an annular body having an inner surface, an annular shoulder defined on the body inner surface, an outer surface, a side passage, an end opening extending from the annular shoulder to an end of the body, and a flow path between the side passage and the end opening for coupling a chamber in an actuator to a reservoir; and
- a poppet slidably fitted within the body wherein the poppet can slide between a first position blocking the side passage and a second position at least partially not blocking the side passage, wherein the poppet comprises,
  - a conical tip section and a poppet shoulder extending radially beyond the conical tip section, and
  - an annular outer surface section between the conical tip section and the poppet shoulder, wherein the annular outer surface section is at least partially within the end opening when the poppet is in the first position.

18. A valve as recited in claim 17 wherein the poppet shoulder and at least a portion of the annular outer surface section are always in communication with the side passage.

19. A valve as recited in claim 17 wherein the conical tip section of the poppet is a section of a 70° cone.

20. A valve as recited in claim 19 wherein the valve body side passage comprises a plurality of circumferentially spaced apart annular slot sections.

21. A valve as recited in claim 18 further comprising:
- an annular check valve sliding surrounding the valve body, the annular check valve comprising,
  - an annular wall, and
  - a check valve flange radially extending from the annular wall.

22. A valve comprising:
- an annular body having an inner surface, an outer surface, a side passage comprising a plurality of circumferentially spaced apart slot sections, an end opening, and a flow path between the side passage and the end opening for coupling a chamber in an actuator to a reservoir; and
- a poppet slidably fitted within the body wherein the poppet can slide between a first position blocking the flow path and a second position not blocking the flow path, wherein the poppet comprises an annular section and a conical tip section extending from the annular section, said tip section being a 70° cone section, and a shoulder extending from the annular section and radially beyond the conical tip section, wherein the shoulder is always in communication with the side passage, wherein each slot section comprises a width defined between a slot section first end and a slot section second end, wherein the poppet comprises a circumferential edge defined at the intersection of the conical section and the poppet annular section, and wherein when the poppet is in the first position, the poppet circumferential edge is radially aligned with first ends of the slot sections.

23. A valve comprising:
- an annular body having an inner surface, an outer surface, a side passage, an end opening, and a flow path between the side passage and the end opening for coupling a chamber in an actuator to a reservoir;
- a valve body inner shoulder formed on the inner surface of the body;
- a poppet slidably fitted within the body wherein the poppet can slide between a first position blocking the flow path and a second position not blocking the flow path; and
- a poppet flange extending radially from an end portion of the poppet for engaging the body inner shoulder for stopping the poppet in the first position.

24. A valve as recited in claim 23 wherein the valve further comprise a spring sandwiched between the body inner shoulder and the poppet flange.

25. A valve comprising:
- an annular body having an inner surface, an outer surface, a side passage, an end opening, and a flow path between the side passage and the end opening for coupling a chamber in an actuator to a reservoir;
- a poppet slidably fitted within the body wherein the poppet can slide between a first position blocking the flow path and a second position not blocking the flow path, wherein the valve poppet is hollow having an inner surface;
- a poppet inner shoulder formed on the inner surface of the poppet;
- a compliant member seated on the poppet inner shoulder;
- a solenoid; and
- a solenoid damper coupled to the solenoid and to the compliant member for transferring a load generated by the solenoid to the compliant member for moving the poppet.

26. A valve as recited in claim 25 wherein the solenoid damper comprises:
- a hollow member having an inner and an outer surface; and
- a flange extending from an end of the member, wherein an opening is formed on the hollow member proximate the flange providing a passage from the inner surface of the hollow member to the outer surface of the hollow member, wherein an annular space is defined between the poppet annular flange and the flange of the solenoid damper, wherein the annular space is in communication with the hollow member opening, and wherein the poppet inner surface, the hollow member inner surface and the annular space are filable with fluid from the sensor reservoir.

27. A valve comprising:

an annular body having an inner surface, an outer surface, a side passage, an end opening, and a flow path between the side passage and the end opening for coupling a chamber in an actuator to a reservoir;

a poppet slidably fitted within the body wherein the poppet can slide between a first position blocking the flow path and a second position not blocking the flow path;

an annular check valve sliding surrounding the valve body, the annular check valve comprising,
an annular wall, and
a check valve flange radially extending from the annular wall;

a flange extending from the body outer surface; and a spring sandwiched between the body flange and the check valve flange.

28. A valve as recited in claim 29 wherein the valve body outer surface further comprises a shoulder, wherein said body outer surface shoulder is engaged by the annular wall of the check valve.

29. A valve as recited in claim 27 further comprising a housing covering the valve body and defining an annular valve chamber between the housing and valve body, wherein the check valve is located within the valve chamber.

30. A suspension control system comprising:

an actuator comprising a housing divided into a first and a second chamber by a piston slidably fitted within the housing, wherein each chamber has a volume, wherein the volume of the first and second chambers changes as the piston reciprocates within the actuator housing;

a fluid control unit comprising,
a fluid reservoir, comprising,
a first passage providing access to the reservoir, and
a second passage providing access to the reservoir;
a sensor within the reservoir for sensing the amount of fluid in the reservoir, the sensor generating signals indicative of the amount of fluid in the reservoir;
a first valve in communication with the reservoir for controlling the flow through the first passage;
a second valve, wherein each of said first and second valves comprises,
an annular body having a side passage, an inner surface, an annular shoulder defined on the body inner surface, and an end opening extending from the annular shoulder to an end of the body, the end opening being in communication with a respective passage on the reservoir, wherein a flow path is defined between the side passage an the end opening, and
a poppet slidably fitted within the body wherein the poppet can slide between a first position blocking the flow path and a second position not blocking the flow path, wherein the poppet comprises,
a conical tip section and a poppet shoulder extending radially beyond the conical tip section, and
an annular outer surface section between the conical tip section and the poppet shoulder, wherein the annular outer surface section is at least partially within the end opening when the poppet is in the first position;
a first conduit coupling the first chamber to the side passage of the first valve;
a second conduit coupling the second chamber to the side passage of the second valve; and
a controller coupled to each valve and to the sensor for controlling the operation of each valve responsive to the signals generated by the sensor.

31. A suspension control system as recited in claim 30 wherein each poppet comprises:
a conical tip section; and
a shoulder spaced apart from the tip section and extending radially beyond the tip section, wherein the shoulder is always in communication with the side passage of its corresponding valve body.

32. A suspension control unit for controlling damping, comprising:

an actuator comprising a housing divided into a first and a second chamber by a piston slidably fitted within the housing, wherein each of the first and second chambers has a volume, wherein the volume of the first and second chambers changes as the piston reciprocates within the actuator housing;

a fluid reservoir storing fluid and coupled to actuator, the reservoir having at least an inlet;

a sensor within the reservoir for generating signals indicative of the amount of fluid in the reservoir;

at least one valve coupled to the actuator and to the reservoir inlet, the valve comprising,
an annular body having an inner surface, an outer surface, a side passage comprising a plurality of circumferentially spaced apart annular slot sections, an end opening, and a flow path between the side passage and end opening coupling a chamber in the actuator to the reservoir, wherein the annular body comprises an inner and an outer surface, and
a poppet slidably fitted within the body wherein the poppet can slide between a first position blocking the flow path and a second position not blocking the flow path, wherein the poppet comprises a conical tip section, a shoulder extending radially beyond the conical tip section and an annular outer surface section between the conical tip section and the shoulder, wherein the conical tip section of the poppet is a section of a 70° cone, wherein the annular section and the shoulder are always in communication with the side passage, and wherein each annular slot section comprises a width defined between a slot section first end and a slot section second end, wherein the poppet comprises a circumferential edge defined at the intersection of the conical section and the poppet annular outer surface section, and wherein when the poppet is in the first position, the poppet circumferential edge is radially aligned with first ends of the slot sections; and a microprocessor for ascertaining the position of the actuator piston responsive to the signals generated by the sensor.

33. A suspension control unit for controlling damping, comprising:

an actuator comprising a housing divided into a first and a second chamber by a piston slidably fitted within the housing, wherein each of the first and second chambers has a volume, wherein the volume of the first and second chambers changes as the piston reciprocates within the actuator housing;

a fluid reservoir storing fluid and coupled to actuator, the reservoir having at least an inlet;

a sensor within the reservoir for generating signals indicative of the amount of fluid in the reservoir;

at least one valve coupled to the actuator and to the reservoir inlet, the valve comprising, an annular body having an inner surface, an outer surface, a side passage, an end opening, and a flow path between the side passage and end opening coupling a chamber in the actuator to the reservoir, wherein the annular body comprises an inner and an outer surface, a poppet slidably fitted within the body wherein the poppet can slide between a first position blocking the flow path and a second position not blocking the flow path a valve body inner shoulder formed on the inner surface of the body, and a poppet flange extending radially from an end portion of the poppet for engaging the body inner shoulder for stopping the poppet in the first position; and a microprocessor for ascertaining the position of the actuator piston responsive to the signals generated by the sensor.

34. A suspension control unit as recited in claim 33 wherein the valve further comprise a spring sandwiched between the body inner shoulder and the poppet flange.

35. A suspension control unit for controlling damping, comprising:

an actuator comprising a housing divided into a first and a second chamber by a piston slidably fitted within the housing, wherein each of the first and second chambers has a volume, wherein the volume of the first and second chambers changes as the piston reciprocates within the actuator housing;

a fluid reservoir storing fluid and coupled to actuator, the reservoir having at least an inlet;

a sensor within the reservoir for generating signals indicative of the amount of fluid in the reservoir;

at least one valve coupled to the actuator and to the reservoir inlet, the valve comprising, an annular body having an inner surface, an outer surface, a side passage, an end opening, and a flow path between the side passage and end opening coupling a chamber in the actuator to the reservoir, wherein the annular body comprises an inner and an outer surface, a poppet slidably fitted within the body wherein the poppet can slide between a first position blocking the flow path and a second position not blocking the flow path, a poppet inner shoulder formed on the inner surface of the poppet, a compliant member seated on the poppet inner shoulder, a solenoid, and a solenoid damper coupled to the solenoid and to the compliant member for transferring a load generated by the solenoid to the compliant member for moving the poppet; and a microprocessor for ascertaining the position of the actuator piston responsive to the signals generated by the sensor.

36. A suspension control unit as recited in claim 35 wherein the solenoid damper comprises:

a hollow member having an inner and an outer surface; and a flange extending from an end of the member, wherein an opening is formed on the hollow member proximate the flange providing a passage from the inner surface of the hollow member to the outer surface of the hollow member, wherein an annular space is defined between the poppet annular flange and the flange of the solenoid damper, wherein the annular space is in communication with the hollow member opening, and wherein the poppet inner surface, the hollow member inner surface and the annular space are filled with fluid from the sensor reservoir.

37. A suspension control unit for controlling damping, comprising:

an actuator comprising a housing divided into a first and a second chamber by a piston slidably fitted within the housing, wherein each of the first and second chambers has a volume, wherein the volume of the first and second chambers changes as the piston reciprocates within the actuator housing;

a fluid reservoir storing fluid and coupled to actuator, the reservoir having at least an inlet;

a sensor within the reservoir for generating signals indicative of the amount of fluid in the reservoir;

at least one valve coupled to the actuator and to the reservoir inlet, the valve comprising, an annular body having an inner surface, an outer surface, a side passage, an end opening, and a flow path between the side passage and end opening coupling a chamber in the actuator to the reservoir, wherein the annular body comprises an inner and an outer surface, a poppet slidably fitted within the body wherein the poppet can slide between a first position blocking the flow path and a second position not blocking the flow path, a housing surrounding the body and defining a valve chamber between the body outer surface and the housing for receiving fluids from an actuator chamber, a by-pass opening on the reservoir surrounding the reservoir inlet and located within the valve chamber, the by-pass opening providing access to the fluid within the reservoir, an annular check valve within the valve chamber and surrounding the valve body, the annular check valve comprising, an annular wall, and a check valve flange radially extending from the annular wall for covering the by-pass opening, a flange extending from the body outer surface within the valve chamber, and a spring sandwiched between the body flange and the check valve flange for holding the check valve in a first position where the check valve flange covers the by-pass opening surrounding the passage, wherein the check valve can slide against a force created by the spring to a second position allowing fluid flow from the reservoir through the by-pass opening; and a microprocessor for ascertaining the position of the actuator piston responsive to the signals generated by the sensor.

38. A suspension control unit as recited in claim 37 wherein the valve body outer surface further comprises a shoulder, wherein said body outer surface shoulder is engaged by the annular wall of the check valve to stop the check valve at the second position.

39. A suspension control unit for controlling damping, comprising:
- an actuator comprising a housing divided into a first and a second chamber by a piston slidably fitted within the housing, wherein each of the first and second chambers has a volume, wherein the volume of the first and second chambers changes as the piston reciprocates within the actuator housing;
- a fluid reservoir storing fluid and coupled to the actuator, the reservoir having at least an inlet;
- a linear variable inductive transformer sensor within the reservoir for generating signals indicative of the amount of fluid in the reservoir, the sensor comprising,
  - a coiled bobbin extending within the reservoir, and
  - an aluminum sensor piston slidably fitted within the reservoir, the piston having an opening on one side for accommodating the bobbin and a second opposite side dividing the reservoir into a first reservoir portion in communication with the fluid and a second reservoir portion housing the bobbin, wherein as the first reservoir portion is filled with fluid it causes the piston to slide toward the bobbin such that the bobbin penetrates the opening;
- at least one valve coupled to the actuator and to the reservoir inlet, the valve comprising,
  - an annular body having an inner surface, an outer surface, a side passage, an end opening, and a flow path between the side passage and end opening coupling a chamber in the actuator to the reservoir, wherein the annular body comprises an inner and an outer surface, and
  - a poppet slidably fitted within the body wherein the poppet can slide between a first position blocking the flow path and a second position not blocking the flow path; and
- a microprocessor for ascertaining the position of the actuator piston responsive to the signals generated by the sensor.

* * * * *